(12) United States Patent
Malet et al.

(10) Patent No.: US 9,579,838 B2
(45) Date of Patent: Feb. 28, 2017

(54) METHOD FOR EXTRUDING A POLYMER IN THE PRESENCE OF WATER

(75) Inventors: Frederic Malet, Rouen (FR); Jean-Jacques Flat, Goupilleres (FR); Francois Touchaleaume, Bassillac (FR); Jacques Devaux, Belgrade (BE); Patricia Krawczak, Douai (FR); Michel Sclavons, Woluwe Saint Lambert-Brussels (BE); Jeremie Soulestin, Montigny en Ostrevent (FR)

(73) Assignees: Arkema France, Colombes (FR); Universite Catholique De Louvain, Louvain el Neuve (BE); Association Pour La Recherche Et Le Developpement Des Methodes Et Processus Industriels—Armines, Paris (FR)

(*) Notice: Subject to any disclaimer, the term of this patent is extended or adjusted under 35 U.S.C. 154(b) by 709 days.

(21) Appl. No.: 13/976,640

(22) PCT Filed: Dec. 23, 2011

(86) PCT No.: PCT/FR2011/053186
§ 371 (c)(1),
(2), (4) Date: Jun. 26, 2014

(87) PCT Pub. No.: WO2012/089976
PCT Pub. Date: Jul. 5, 2012

(65) Prior Publication Data
US 2015/0048541 A1    Feb. 19, 2015

(30) Foreign Application Priority Data

Dec. 27, 2010    (FR) .................................... 10 61274

(51) Int. Cl.
| | | |
|---|---|---|
| *B29C 47/00* | (2006.01) | |
| *B29C 47/10* | (2006.01) | |
| *B29C 47/80* | (2006.01) | |
| *C08G 63/91* | (2006.01) | |
| *C08G 69/40* | (2006.01) | |
| *B29C 47/76* | (2006.01) | |
| *B29K 77/00* | (2006.01) | |
| *B29K 105/00* | (2006.01) | |
| *B29K 105/16* | (2006.01) | |

(52) U.S. Cl.
CPC ...... *B29C 47/0071* (2013.01); *B29C 47/1063* (2013.01); *B29C 47/805* (2013.01); *C08G 63/916* (2013.01); *C08G 69/40* (2013.01); *B29C 47/0004* (2013.01); *B29C 47/0011* (2013.01); *B29C 47/0019* (2013.01); *B29C 47/0023* (2013.01); *B29C 47/1045* (2013.01); *B29C 47/762* (2013.01); *B29K 2077/00* (2013.01); *B29K 2105/0005* (2013.01); *B29K 2105/16* (2013.01)

(58) Field of Classification Search
CPC .................................. B29C 47/76; C08F 2/04
See application file for complete search history.

(56) References Cited

U.S. PATENT DOCUMENTS

| | | | | |
|---|---|---|---|---|
| 3,519,577 A | * | 7/1970 | Olson ................ | C08G 18/0871 428/402 |
| 3,542,709 A | * | 11/1970 | Kazama ............ | C08G 18/0852 524/751 |
| 4,198,265 A | * | 4/1980 | Johnson ................... | B01D 1/00 159/2.2 |
| 5,061,764 A | * | 10/1991 | Harris .................... | B29C 67/246 525/471 |
| 5,859,177 A | | 1/1999 | Berger et al. | |
| 5,910,540 A | * | 6/1999 | Takahashi ............. | C08L 53/025 525/92 B |
| 7,960,473 B2 | | 6/2011 | Kobayashi et al. | |
| 2004/0094862 A1 | * | 5/2004 | Sturm ................. | B29C 47/6012 264/211 |
| 2004/0235586 A1 | | 11/2004 | Chen et al. | |
| 2006/0079561 A1 | | 4/2006 | Lahm et al. | |
| 2009/0221744 A1 | | 9/2009 | Thormeier et al. | |
| 2010/0273944 A1 | | 10/2010 | Kobayashi et al. | |

FOREIGN PATENT DOCUMENTS

| | | |
|---|---|---|
| EP | 1 413 595 | 4/2004 |
| EP | 2 017 306 | 1/2009 |
| EP | 2 098 354 | 9/2009 |
| WO | WO-9724389 | 7/1997 |

OTHER PUBLICATIONS

International Search Report for PCT/FR2011/053186, Date of actual completion of the international search: Mar. 22, 2012, Date of mailing of the international search report: Apr. 12, 2012.
Atofina, "Process for increasing the melting point and the melting enthalpy of polyamides by water treatment," Espacenet, Publication Date: Apr. 28, 2004; English Abstract of EP-1 413 595.

* cited by examiner

*Primary Examiner* — Galen Hauth

(57) ABSTRACT

The invention relates to a method for converting a polycondensed elastomeric thermoplastic polymer, including a step of extruding the polycondensed elastomeric thermoplastic polymer in the presence of water. The polycondensed elastomeric thermoplastic polymer is in particular chosen from copolymer block amides, copolyethers or copolyester block urethanes, copolyether block esters and the mixtures thereof, and is preferably a copolyether block amide.

20 Claims, No Drawings

METHOD FOR EXTRUDING A POLYMER IN THE PRESENCE OF WATER

FIELD OF THE INVENTION

The present invention relates to a process of extrusion of a polymer in the presence of water.

TECHNICAL BACKGROUND

It is known to use polycondensed elastomeric thermoplastic polymers and in particular copolyether-block-amides in the production of varied shaped articles (soles, belts, and the like), this being achieved by simple extrusion or by injection into a mold.

However, this technique presents problems of decomposition of the polymers during extrusion. This decomposition can be reflected in particular by a discoloration, a fall in the molar mass and an accelerated aging of the products.

There thus exists a real need to develop a process for the conversion of a polycondensed elastomeric thermoplastic polymer in which the decomposition of the polymer during extrusion is reduced.

The document EP 1 037 941 describes the extrusion of a composite preparation comprising polyamide and a solid substance of clay type, in the presence of water, with the aim of avoiding a preliminary stage of exfoliation of the clay. This document does not make it possible to solve the problem posed, if only because the polyamide is not an elastomer.

SUMMARY OF THE INVENTION

The invention relates first to a process for the conversion of a polycondensed elastomeric thermoplastic polymer, comprising a stage of extrusion of the polycondensed elastomeric thermoplastic polymer in the presence of water.

According to one embodiment, the extrusion stage is carried out in an extruder, the process comprising the feeding of the extruder with polycondensed elastomeric thermoplastic polymer, the feeding of the extruder with water and the venting of water vapor from the extruder.

According to one embodiment, the extrusion stage is carried out at a temperature of 20 to 100° C. greater than the melting point of the polycondensed elastomeric thermoplastic polymer in the presence of water, preferably greater by 30 to 80° C. than this melting point.

According to one embodiment, the proportion by weight of water with respect to the polycondensed elastomeric thermoplastic polymer during the extrusion stage is from 1% to 50%, preferably from 5% to 30%.

According to one embodiment, the polycondensed elastomeric thermoplastic polymer is chosen from copolyether-block-amides, copolyether-block-urethanes, copolyester-block-urethanes, copolyether-block-esters and the blends of these and is preferably a copolyether-block-amide.

According to one embodiment, the polycondensed elastomeric thermoplastic polymer is a copolyether-block-amide comprising from 1% to 80% by weight of polyether blocks and from 20% to 99% by weight of polyamide blocks, preferably from 4% to 80% by weight of polyether blocks and from 20% to 96% by weight of polyamide blocks.

According to one embodiment, the copolyether-block-amide comprises a flexible poly(tetramethylene ether) glycol block.

According to one embodiment, the polyamide is polyamide 12.

According to one embodiment, the polycondensed elastomeric thermoplastic polymer is extruded in the absence of any other compound, with the exception of water.

According to one embodiment, the polycondensed elastomeric thermoplastic polymer is extruded in the presence of an additional compound capable of forming a composite material with the polycondensed elastomeric thermoplastic polymer, the additional compound preferably being a heat-sensitive filler.

According to one embodiment, the process comprises the production of at least one shaped article on conclusion of the extrusion stage.

According to one embodiment, the process comprises the production of granules on conclusion of the extrusion stage.

According to one embodiment, the process comprises subsequent stages of melting and of extrusion of the granules and of injection into a mold, making it possible to obtain at least one shaped article.

The present invention makes it possible to overcome the disadvantages of the state of the art. More particularly, it provides a process for the conversion of a polycondensed elastomeric thermoplastic polymer, in which the decomposition of the polymer during the extrusion is reduced in comparison with the processes of the state of the art.

This is accomplished by virtue of the addition of water during the extrusion of the polymer. This result is surprising insofar as polycondensed elastomeric thermoplastic polymers are generally sensitive to hydrolysis (in particular the polyamide blocks and the aliphatic ester groups). Without wishing to be committed to a theory, the inventors believe that the presence of water makes it possible to plasticize and lubricate the material during the extrusion, which protects it from thermal decomposition. In addition, the presence of water does not result in significant hydrolysis due to the relatively slow kinetics of the hydrolysis and the short contact time of the polymer with the water (typically less than approximately 30 seconds).

DESCRIPTION OF EMBODIMENTS OF THE INVENTION

The invention is now described in more detail and without implied limitation in the description which follows.

The term "elastomeric thermoplastic polymer" denotes a polymer which constitutes a multiphase material exhibiting at least two transitions, namely a first transition at a temperature T1 (this is generally the glass transition temperature) and a second transition at a temperature T2 greater than T1 (this is generally the melting point). The material is rigid at a temperature below T1, has an elastic behavior between T1 and T2 and is molten above T2. Such a polymer combines the elastic behavior of materials of rubber type with the ability for conversion of thermoplastics.

The term "polycondensed polymer" denotes a polymer capable of being obtained by a combination of condensation stages, a small molecule (such as a water molecule, for example) being eliminated at each stage.

The polymers used in the context of the invention can be chosen from the group consisting of copolyether-block-amides, copolyether-block-urethanes, copolyester-block-urethanes and copolyether-block-esters, and combinations of these.

The implementation of the invention supposes the use of polymers exhibiting a good miscibility with water, which excludes relatively hydrophobic polymers.

Particularly surprising and advantageous results in terms of limitation of the decomposition are obtained with copolyether-block-amides.

Copolyether-block-amides, also known as copolymers having polyether blocks and polyamide blocks, or "PEBA" as an abbreviation, result from the polycondensation of polyamide blocks having reactive ends with polyether blocks having reactive ends, such as, inter alia:
1) polyamide blocks having diamine chain ends with polyoxyalkylene blocks having dicarboxylic chain ends;
2) polyamide blocks having dicarboxylic chain ends with polyoxyalkylene blocks having diamine chain ends, obtained by cyanoethylation and hydrogenation of α,ω-dihydroxylated aliphatic polyoxyalkylene blocks, known as polyether diols;
3) polyamide blocks having dicarboxylic chain ends with polyether diols, the products obtained being, in this particular case, polyetheresteramides.

The polyamide blocks having dicarboxylic chain ends originate, for example, from the condensation of polyamide precursors in the presence of a chain-limiting dicarboxylic acid. The polyamide blocks having diamine chain ends originate, for example, from the condensation of polyamide precursors in the presence of a chain-limiting diamine.

The number-average molar mass Mn of the polyamide blocks is between 400 and 20 000 g/mol and preferably between 500 and 10 000 g/mol.

The polymers having polyamide blocks and polyether blocks can also comprise randomly distributed units.

Use may advantageously be made of three types of polyamide blocks.

According to a first type, the polyamide blocks originate from the condensation of dicarboxylic acid, in particular those having from 4 to 20 carbon atoms, preferably those having from 6 to 18 carbon atoms, and of an aliphatic or aromatic diamine, in particular those having from 2 to 20 carbon atoms, preferably those having from 6 to 14 carbon atoms.

Mention may be made, as examples of dicarboxylic acids, of 1,4-cyclohexanedicarboxylic acid, butanedioic acid, adipic acid, azelaic acid, suberic acid, sebacic acid, dodecanedicarboxylic acid, octadecanedicarboxylic acid, terephthalic acid, isophthalic acid, but also dimerized fatty acids.

Mention may be made, as examples of diamines, of tetramethylenediamine, hexamethylenediamine, 1,10-decamethylenediamine, dodecamethylenediamine, trimethylhexamethylenediamine, isomers of bis(4-aminocyclo-hexyl)methane (BACM), bis(3-methyl-4-aminocyclo-hexyl)methane (BMACM), and 2,2-bis(3-methyl-4-aminocyclohexyl)propane (BMACP), and di(para-aminocyclohexyl)methane (PACM), and isophoronediamine (IPDA), 2,6-bis(aminomethyl)norbornane (BAMN) and piperazine (Pip).

Advantageously, PA4.12, PA4.14, PA4.18, PA6.10, PA6.12, PA6.14, PA6.18, PA9.12, PA10.10, PA10.12, PA10.14 and PA10.18 blocks are available.

According to a second type, the polyamide blocks result from the condensation of one or more α,ω-amino-carboxylic acids and/or of one or more lactams having from 6 to 12 carbon atoms in the presence of a dicarboxylic acid having from 4 to 12 carbon atoms or of a diamine. Mention may be made, as examples of lactams, of caprolactam, oenantholactam and lauryllactam. Mention may be made, as examples of α,ω-aminocarboxylic acids, of aminocaproic acid, 7-aminoheptanoic acid, 11-aminoundecanoic acid and 12-aminododecanoic acid.

Advantageously, the polyamide blocks of the second type are of polyamide 11, of polyamide 12 or of polyamide 6.

According to a third type, the polyamide blocks result from the condensation of at least one α,ω-amino-carboxylic acid (or a lactam), at least one diamine and at least one dicarboxylic acid.

In this case, the polyamide PA blocks are prepared by polycondensation:
of the linear aliphatic or aromatic diamine or diamines having X carbon atoms;
of the dicarboxylic acid or acids having Y carbon atoms; and
of the comonomer or comonomers {Z}, chosen from lactams and α,ω-aminocarboxylic acids having Z carbon atoms and equimolar mixtures of at least one diamine having X1 carbon atoms and of at least one dicarboxylic acid having Y1 carbons atoms, (X1, Y1) being different from (X, Y);
said comonomer or comonomers {Z} being introduced in a proportion by weight ranging up to 50%, preferably up to 20% and more advantageously still up to 10%, with respect to the combined polyamide precursor monomers;
in the presence of a chain-limiting agent chosen from dicarboxylic acids.

Use is advantageously made, as chain-limiting agent, of the dicarboxylic acid having Y carbon atoms, which is introduced in excess with respect to the stoichiometry of the diamine or diamines.

According to an alternative form of this third type, the polyamide blocks result from the condensation of at least two α,ω-aminocarboxylic acids or of at least two lactams having from 6 to 12 carbon atoms or of a lactam and of an aminocarboxylic acid not having the same number of carbon atoms, in the optional presence of a chain-limiting agent. Mention may be made, as examples of aliphatic α,ω-aminocarboxylic acids, of aminocaproic acid, 7-aminoheptanoic acid, 11-aminoundecanoic acid and 12-aminododecanoic acid. Mention may be made, as examples of lactam, of caprolactam, oenantholactam and lauryllactam. Mention may be made, as examples of aliphatic diamines, of hexamethylenediamine, dodecamethylenediamine and trimethylhexamethylene-diamine. Mention may be made, as example of cycloaliphatic diacids, of 1,4-cyclohexanedicarboxylic acid. Mention may be made, as examples of aliphatic diacids, of butanedioic acid, adipic acid, azelaic acid, suberic acid, sebacic acid, dodecanedicarboxylic acid, dimerized fatty acids (these dimerized fatty acids preferably have a dimer content of at least 98%; preferably, they are hydrogenated; they are sold under the Pripol® brand by Uniqema or under the Empol® brand by Henkel) and polyoxyalkylene-α,ω-diacids. Mention may be made, as examples of aromatic diacids, of terephthalic acid (T) and isophthalic acid (I). Mention may be made, as examples of cycloaliphatic diamines, of the isomers of bis(4-aminocyclohexyl)methane (BACM), bis(3-methyl-4-aminocyclohexyl)methane (BMACM), and 2,2-bis(3-methyl-4-aminocyclohexyl)propane (BMACP), and di(para-aminocyclohexyl)methane (PACM). The other diamines commonly used can be isophoronediamine (IPDA), 2,6-bis(aminomethyl)norbornane (BAMN) and piperazine.

Mention may be made, as examples of polyamide blocks of the third type, of the following:
6.6/6, in which 6.6 denotes hexamethylenediamine units condensed with adipic acid. 6 denotes units resulting from the condensation of caprolactam.

6.6/6.10/11/12, in which 6.6 denotes hexamethylenediamine condensed with adipic acid. 6.10 denotes hexamethylenediamine condensed with sebacic acid. 11 denotes units resulting from the condensation of aminoundecanoic acid. 12 denotes units resulting from the condensation of lauryllactam.

The weight Mn of the polyether blocks is between 100 and 6 000 g/mol and preferably between 200 and 3 000 g/mol.

Preferably, the polymer comprises from 1% to 80% by weight of polyether blocks and from 20% to 99% by weight of polyamide blocks, preferably from 4% to 80% by weight of polyether blocks and from 20% to 96% by weight of polyamide blocks.

The polyether blocks consist of alkylene oxide units. These units can, for example, be ethylene oxide units, propylene oxide units or tetrahydrofuran units (which results in polytetramethylene glycol sequences). Use is thus made of PEG (polyethylene glycol) blocks, that is to say those consisting of ethylene oxide units, PPG (polypropylene glycol) blocks, that is to say those consisting of propylene oxide units, PO3G (polytrimethylene glycol) blocks, that is to say those consisting of trimethylene ether units (such copolymers with polytrimethylene ether blocks are described in the document U.S. Pat. No. 6,590,065), and PTMG blocks, that is to say those consisting of tetramethylene glycol units, also known as polytetrahydrofuran blocks. The PEBA copolymers can comprise, in their chain, several types of polyethers, it being possible for the copolyethers to be block or random copolyethers.

Use may also be made of blocks obtained by oxyethylation of bisphenols, such as, for example, bisphenol A. The latter products are described in the patent EP 613 919.

The polyether blocks can also consist of ethoxylated primary amines. Mention may be made, as examples of ethoxylated primary amines, of the products of formula:

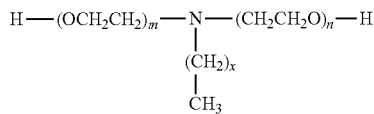

in which m and n are between 1 and 20 and x is between 8 and 18. These products are available commercially under the Noramox® brand from CECA and under the Genamin® brand from Clariant.

The flexible polyether blocks can comprise polyoxyalkylene blocks having $NH_2$ chain ends, it being possible for such blocks to be obtained by cyanoacetylation of α,ω-dihydroxylated aliphatic polyoxyalkylene blocks, known as polyether diols. More particularly, use may be made of Jeffamines (for example Jeffamine® D400, D2000, ED 2003 or XTJ 542, commercial products from Huntsman, also described in the patent documents JP2004346274, JP2004352794 and EP 1 482 011).

The polyether diol blocks are either used as is and copolycondensed with polyamide blocks having carboxylic ends, or they are aminated in order to be converted into polyether diamines and condensed with polyamide blocks having carboxylic ends. The general method for the preparation in two stages of the PEBA copolymers having ester bonds between the PA blocks and the PE blocks is known and is described, for example, in the French patent FR 2 846 332. The general method for the preparation of the PEBA copolymers of the invention having amide bonds between the PA blocks and the PE blocks is known and is described, for example, in the European patent EP 1 482 011. The polyether blocks can also be mixed with polyamide precursors and a diacid chain-limiting agent in order to produce polymers having polyamide blocks and polyether blocks which have randomly distributed units (one-stage process).

Of course, the designation PEBA in the present description of the invention relates equally well to the Pebax® products sold by Arkema, to the Vestamid® products sold by Evonik, to the Grilamid® products sold by EMS, to the Kellaflex® products sold by DSM or to any other PEBA from other suppliers.

Advantageously, the PEBA copolymers have PA blocks of PA 6, of PA 11, of PA 12, of PA 6.12, of PA 6.6/6, of PA 10.10 and/or of PA 6.14, preferably PA 11 and/or PA blocks; and PE blocks of PTMG, of PPG and/or of PO3G. The PEBAs based on PE blocks predominantly consisting of PEG are to be placed in the range of the hydrophilic PEBAs. The PEBAs based on PE blocks predominantly consisting of PTMG are to be placed in the range of the hydrophobic PEBAs.

Advantageously, said PEBA used in the composition according to the invention is obtained, at least partially, from bioresourced starting materials.

The term "starting materials of renewable origin" or "bioresourced starting materials" is understood to mean substances which comprise bioresourced carbon or carbon of renewable origin. Specifically, unlike substances resulting from fossil materials, substances composed of renewable starting materials comprise $^{14}C$. The "content of carbon of renewable origin" or "content of bioresourced carbon" is determined by the application of the standards ASTM D 6866 (ASTM D 6866-06) and ASTM D 7026 (ASTM D 7026-04). By way of example, the PEBAs based on polyamide 11 originate at least in part from bioresourced starting materials and exhibit a content of bioresourced carbon of at least 1%, which corresponds to a $^{12}C/^{14}C$ isotopic ratio of at least $1.2 \times 10^{-14}$. Preferably, the PEBAs according to the invention comprise at least 50% by weight of bioresourced carbon with respect to the total weight of carbon, which corresponds to a $^{12}C/^{14}C$ isotopic ratio of at least $0.6 \times 10^{-12}$. This content is advantageously higher, in particular up to 100%, which corresponds to a $^{12}C/^{11}C$ isotopic ratio of $1.2 \times 10^{-12}$, in the case of PEBA having PA 11 blocks and PE blocks comprising PO3G, PTMG and/or PPG resulting from starting materials of renewable origin.

Use may be also be made of a copolyether-block-urethane comprising a flexible poly(oxyalkylene) block and a polyurethane block.

The polyurethane blocks can be obtained by reaction between a diisocyanate and a diol.

The flexible polyether blocks can be as described above in connection with the PEBAs.

Use may also be made of a copolyether-block-ester comprising a flexible poly(oxyalkylene) block and a polyester block.

The polyester block can be obtained by polycondensation, by esterification of a dicarboxylic acid, such as isophthalic acid or terephthalic acid or a biosourced dicarboxylic acid (such as furandicarboxylic acid), with a glycol, such as ethylene glycol, trimethylene glycol, propylene glycol or tetramethylene glycol.

The flexible polyether blocks can be as described above in connection with the PEBAs.

The process according to the invention comprises the feeding of an extruder (for example a twin-screw extruder) with the above polymer in the solid state and the feeding of the extruder with water. The polymer is melted and blended with the water, and the water is subsequently removed by venting water vapor before the departure of the polymer from the extruder (by means of a venting opening) or optionally simultaneously with the departure of the polymer from the extruder.

The water is preferably introduced in a proportion by weight of 1% to 50% and for example of 5% to 30%, with respect to the amount of polymer. The presence of water in the extruder makes it possible to reduce the extrusion temperature, for example by 10 to 60° C. approximately in the case of polymers of copolyether-block-esteramide type.

For example, the temperature during the extrusion can be from 20 to 100° C. greater than the melting point of the material (polymer and water), preferably greater by 30 to 80° C. with respect to this melting point.

The polymer can be extruded alone (despite the presence of water) or else in the presence of an additional compound capable of forming a composite material with the polymer. It is advantageous in particular to use, as additional compound, a heat-sensitive filler. Mention may be in particular be made, as examples of heat-sensitive fillers, of starch and especially native starch.

On conclusion of the extrusion stage, after cooling and optionally cutting up the material, the following are obtained: either polymer granules or, directly, shaped articles (such as pipes, films, profiled elements, and the like), depending on the shape of the die of the extruder.

In the case where polymer granules are obtained, these granules can in their turn be used to manufacture shaped articles, by means of a subsequent stage of extrusion of the granules and of injection into a mold. The molded material is pressurized and cooled in order to provide shaped articles.

For example, the temperature during the extrusion can be from 20 to 100° C. greater than the melting point of the material, preferably greater by 30 to 80° C. with respect to this melting point.

The product can be chosen from motor vehicle parts, textiles, woven or nonwoven materials, clothing, footwear, sports equipment, recreational equipment, electronic objects, computer hardware, healthcare equipment, industrial additives, packaging and household products. Mention may in particular be made of dashboards, air bags, soles for sports shoes, golf balls, tubes for medical use, catheters, angioplasty balloons, peristaltic belts, the belts of conveyor belts, waterproof-breathable products, synthetic leather and/or skin, thermoplastic films or packaging films.

The inventors have found, with surprise, that the effect of low decomposition of the polymer obtained according to the invention is retained even when the initial extrusion is followed by a second extrusion and injection molding, even if the second extrusion is not carried out in the presence of water.

EXAMPLES

The following examples illustrate the invention without limiting it.

Example 1

Miscibility of a Copolyether-Block-Amide (PEBA) with Water

A PEBA based on polyamide 12, sold by Arkema France under the Pebax® brand, is used. Its molar composition is 24.8% polytetramethylene ether glycol, 73% polyamide 12 and 2.2% adipic acid as linking component.

A low pressure differential scanning colorimeter (Mettler Toledo HPDSC 827¹, maximum pressure of 100 bar) is used in order to study the phase separation or the miscibility of the PEBA and water at high pressure and high temperature. The measurement chamber is connected to a pressure control valve (Brooks PC 5866) controlled by a Brooks valve controller (ReadOut & Control Electronics 0152).

Thus, the temperature and the pressure are set independently in the oven of the calorimeter and constant-pressure heating or cooling curves can be obtained, which makes it possible to simulate the extrusion conditions. The water and the PEBA powder are blended with a 70:30 ratio by weight, the total sample weighing approximately 10 mg. The PEBA granules are cryogenically ground in a grinder (Pulverisette 14, Fritsch) at 14000 rpm.

The results obtained are as follows:

At atmospheric pressure, two peaks are observed on the first heating curve. The first peak (main) is immediately above 100° C. and corresponds to the evaporation of the water. The second is located at 171° C. and corresponds to the melting of the polymer. The melting temperature is identical to that of the pure PEBA since the water has evaporated beforehand. The cooling curve is similar, with just one peak for crystallization of the polymer at 146° C.

At high pressure (80 bar), just one peak is observed at 153.5° C. The peak for boiling of the water (normally at 295° C. at this pressure) has disappeared and the remaining peak corresponds to the melting of a single phase comprising the polymer and the water. This peak is offset by 17.5° C. with respect to the peak of the PEBA alone.

At other pressures (20, 40 or 60 bar), the melting point of the PEBA/water phase still appears at the same temperature of 153.5° C.

Example 2

Extrusion and Impact on the Decomposition of the PEBA

The PEBA of example 1 is introduced into a corotating twin-screw extruder (Coperion Megacompounder, length to 1 m, L/D ratio of 40, screw diameter of 25 mm) equipped with a water injection pump and with two venting openings. The melting pressure imposed by the screws (of 70 to 100 bar) at the water injection point is greater than the vapor pressure curve of the water.

The temperature is set at 190° C. all along the screw (with a true temperature of 20° C. lower at the water injection point) and the rotational speed is 200 rpm. The polymer is introduced at a throughput of 7 kg/h and the water at a throughput of 3 l/h.

After drying at 90° C. for 16 h, the injection molding of ISO 527-2 dumbbells (type 1A) was carried out on a Kraus Maffei 80-160$^E$. The injection temperatures were regulated from 190° C. (feed zone) to 230° C. (nozzle), with a mold temperature of 20° C., a back pressure of 75 bar, a rotational speed of the screw of 80 mm/s and a holding pressure of 400 bar for 29 s.

The molecular weights of the materials are evaluated by diffusion exclusion chromatography (GPC, Waters Alliance 2695) using hexafluoroisopropanol as solvent at 40° C. The samples are dissolved for 24 hours at a concentration of 1 g/l. A UV refractometer detector regulated at 228 nm is used and calibration is carried out with polymethyl methacrylate references. The number-average molecular weight (Mn) and the weight-average molecular weight (Mw) are thus given in "PMMA equivalents".

The results obtained are summarized in the following table:

| Sample | Mn | Mw | Mw/Mn |
|---|---|---|---|
| Unconverted crude PEBA | 39 100 | 82 800 | 2.1 |
| PEBA undergoing an extrusion/injection molding in one stage, without water | 30 500 | 63 500 | 2.1 |
| PEBA undergoing an extrusion in the presence of water | 39 600 | 78 800 | 2.0 |
| PEBA undergoing an extrusion in the presence of water, followed by an extrusion/injection molding | 38 100 | 77 100 | 2.0 |
| PEBA undergoing an extrusion without water | 36 200 | 73 200 | 2.0 |
| PEBA undergoing an extrusion without water, followed by an extrusion/injection molding | 29 400 | 62 300 | 2.1 |

It is found that the decrease in molecular weight of the PEBA during the conversion of said PEBA is lower when water is used during the extrusion than in the absence of water, which means that the polymer decomposes less in the presence of water. Furthermore, the polydispersity index Mw/Mn is retained.

The invention claimed is:

1. A process for the conversion of a polycondensed elastomeric thermoplastic polymer, comprising a stage of extrusion of the polycondensed elastomeric thermoplastic polymer in the presence of water, in which the proportion by weight of the water with respect to the polycondensed elastomeric thermoplastic polymer during the extrusion stage is 30% to 50%.

2. The process as claimed in claim 1, in which the extrusion stage is carried out in an extruder, the process comprising the feeding of the extruder with polycondensed elastomeric thermoplastic polymer, the feeding of the extruder with water and the venting of water vapor from the extruder.

3. The process as claimed in claim 1, in which the extrusion stage is carried out at a temperature of 20 to 100° C. greater than the melting point of the polycondensed elastomeric thermoplastic polymer in the presence of water.

4. The process as claimed in claim 1, in which the proportion by weight of water with respect to the polycondensed elastomeric thermoplastic polymer during the extrusion stage is 50%.

5. The process as claimed in claim 1, in which the polycondensed elastomeric thermoplastic polymer is selected from the group consisting of copolyether-block-amides, copolyether-block-urethanes, copolyester-block-urethanes, copolyether-block-esters and the blends thereof.

6. The process as claimed in claim 1, in which the polycondensed elastomeric thermoplastic polymer is a copolyether-block-amide comprising 1% to 80% by weight of polyether blocks and 20% to 99% by weight of polyamide blocks.

7. The process as claimed in claim 6, in which the copolyether-block-amide comprises a flexible poly(tetramethylene ether) glycol block.

8. The process as claimed in claim 6, in which the polyamide is polyamide 12.

9. The process as claimed in claim 1, in which the polycondensed elastomeric thermoplastic polymer is extruded in the absence of any other compound, with the exception of water.

10. The process as claimed in claim 1, in which the polycondensed elastomeric thermoplastic polymer is extruded in the presence of an additional compound capable of forming a composite material with the polycondensed elastomeric thermoplastic polymer.

11. The process as claimed in claim 1, further comprising the production of at least one shaped article on conclusion of the extrusion stage.

12. The process as claimed in claim 1, further comprising the production of granules on conclusion of the extrusion stage.

13. The process as claimed in claim 12, further comprising subsequent stages of melting and of extrusion of the granules and of injection into a mold, making it possible to obtain at least one shaped article.

14. The process as claimed in claim 1, in which the extrusion stage is carried out at a temperature of 30 to 80° C. greater than the melting point of the polycondensed elastomeric thermoplastic polymer in the presence of water.

15. The process as claimed in claim 1, in which the polycondensed elastomeric thermoplastic polymer is a copolyether-block-amide.

16. The process as claimed in claim 1, in which the polycondensed elastomeric thermoplastic polymer is a copolyether-block-amide comprising 4% to 80% by weight of polyether blocks and 20% to 96% by weight of polyamide blocks.

17. The process as claimed in claim 1, in which the polycondensed elastomeric thermoplastic polymer is extruded in the presence of an additional compound capable of forming a composite material with the polycondensed elastomeric thermoplastic polymer, the additional compound being a heat-sensitive filler.

18. The process as claimed in claim 1, in which the proportion by weight of water with respect to the polycondensed elastomeric thermoplastic polymer during the extrusion stage is 30%.

19. The process as claimed in claim 1, wherein the contact time of the polymer with the water is less than about 30 seconds.

20. The process as claimed in claim 1, wherein the contact time of the polymer with the water is less than 30 seconds.

* * * * *